(12) United States Patent
Howell

(10) Patent No.: US 6,252,494 B1
(45) Date of Patent: Jun. 26, 2001

(54) TIMED DISPENSER FOR PROGRAMMED FLUID CONSUMPTION

(76) Inventor: Michael D. Howell, 18213 SE. Fairview Cir., Tequesta, FL (US) 33469

( * ) Notice: Subject to any disclaimer, the term of this patent is extended or adjusted under 35 U.S.C. 154(b) by 0 days.

(21) Appl. No.: 09/493,745

(22) Filed: Jan. 28, 2000

(51) Int. Cl.[7] ..................................................... G08B 1/00

(52) U.S. Cl. ................. 340/309.15; 340/32; 340/825.19; 340/309.3

(58) Field of Search ............................ 340/573.1, 825.19, 340/309.3, 321, 309.15

(56) References Cited

U.S. PATENT DOCUMENTS 4,828,551 * 5/1989 Gertler et al. ........................ 604/208

* cited by examiner

Primary Examiner—Daryl Pope
(74) Attorney, Agent, or Firm—McHale & Slavin

(57) ABSTRACT

This invention relates to a drink dispensing device, particularly to a device designed for dispensing of particular amounts of water or alternative fluids to an individual, and most particularly to a device which includes a timing function for prompting consumption at programmed intervals. In a particular embodiment, the drink dispensing device is in the form of a drinking glass containing volumetric measuring indicia for monitoring the amount of fluid currently contained in, or consumed from, the vessel; and a time monitoring device having multiple programming mode

11 Claims, 4 Drawing Sheets

DELUXE DISPLAY

DELUXE CONTROLS

BASE DISPLAY

BASE CONTROL

COASTER STYLE CONTROLS – RELATIVE TIME ONLY

TIMED DISPENSER FOR PROGRAMMED FLUID CONSUMPTION

FIELD OF THE INVENTION

This invention relates to a drink dispensing device, particularly to a device designed for dispensing of particular amounts of water or alternative fluids to an individual, and most particularly to a device which includes a timing function for prompting consumption at programmed intervals.

BACKGROUND OF THE INVENTION

Dietary guidelines espoused by physicians and nutritionists suggest that to maintain optimum function, an individual ought to consume at least about 64 ounces of water or similar non-caffeine containing fluid per day. This amount is generally divided into eight or more 8 oz. glasses. It is suggested that this fluid be consumed at regular intervals throughout the day. Such a dosing regimen is reasonably convenient, and assures that adequate hydration of the human body is constantly maintained.

Problems arise, however, in remembering such details as the number of glasses already consumed, the time between servings and the amount of fluids consumed in each serving and in total throughout the day. Thus, individuals often tend to consume rather large quantities at one sitting in order to satisfy the daily requirements with the least amount of bother. The problem with this approach is that elimination of such large quantities often becomes problematic. Further, the rapidity of such elimination can actually be counterproductive to the goal of proper hydration, since fluid overloading coupled with rapid hydration can lead to abnormal levels of anti-diuretic hormone production, resulting in the body becoming somewhat dehydrated or electrolytically imbalanced.

The instant invention provides for a dispensing device containing volumetric measuring indicia for monitoring the amount of fluid currently contained in, or consumed from, the vessel; and a time monitoring device having multiple programming mode capability. Such capabilities enable the device to portray the current time, alert the consumer to the passage of a particularly desired time interval, e.g. 1, 2, 4 hours or the like; maintain a real-time summary of total fluids consumed, rate of consumption, time interval between consumption, and the like data.

DESCRIPTION OF THE PRIOR ART

U.S. Pat. No: 5,644,298 describes a cup that measures the amount of water per serving and how many servings have been ingested in a day. A rotating bezel at the base or middle of the cup indicates the number of glasses that have been consumed, while the inside of the vessel has measuring lines to indicate the current amount of water contained in the glass. The bezel is surrounded by a jacket with a window that exposes only the current number of glasses consumed. Further, the glass is operated either manually or electronically. The electrical embodiment is composed of a pressure sensor that, when the glass is filled to the optimum 8 ounces, increases the number in the display window by one. This display informs the consumer of the amount of glasses of water that have been drunk thus far. The electrical version of the product is battery powered and may be reset or deactivated if desired.

U.S. Pat. No: 5,607,078 discloses a device that is also intended to count the amount of water that has been consumed in a given twenty-four hour period. Inside the vessel, are marks that measure the amount of fluids the glass contains. On the handle, there is a scale from 0–10 with a sliding indicator that portrays the amount of glasses that have been consumed thus far. This adjustment is done manually. U.S. Pat. No: 5,845,777 discloses a clear plastic cup that informs the user how many glasses of water they have drunk. A rotating bezel indicates the amount of fluids that have been consumed. A cover surrounds the bezel so that only the current number is revealed through a small window. There are second, third, and fourth embodiments of the invention where the number is portrayed in the bottom of the glass, on a lid, and in mid-glass respectively. All of these versions contain a covering so only the current number is exposed, and all are operated manually.

U.S. Pat. No: 5,313,439 discloses a medicine container that is intended to inform the user when it is time to take another dosage of their prescription. There are three embodiments of this invention. First, in the pill bottle form, a lid that contains a battery, an alarm (either audio or visual light), a timer, and circuit that directly connects to the bottle itself when closed (using the tamper resistant foil on top of the bottle to complete the circuit). Once the lid has been put into place on top of the bottle, the circuit is closed and the timer is activated. The timer will count down the hours until the user is to take their medication again, at which time the alarm is sounded or lit (depending on which type of alarm device the bottle contains). Another embodiment of the invention relates to pills that are contained in a foil wrapper.

SUMMARY OF THE INVENTION

The present invention is drawn to a drink dispensing device for dispensing particular amounts of water or alternative fluids to an individual. In a particular embodiment the device includes a timing function for prompting consumption at programmed intervals. In an illustrative, but non-limiting embodiment, the device includes a drinking glass or similar drinking vessel that is graduated by the inclusion of particular indicia, in the form of measuring lines, which inform the user of the amount of water currently contained within the cup. At the base of the glass, a programmable monitoring and timing device, for example a liquid crystal display module, may be incorporated integral with the glass, for example within its base, and can be set to indicate multiple functions such as the time of day, number of glasses drunk, and time interval therebetween. A timer, which can be set for a predetermined time interval, e.g. one, two, four hours or the like, provides the user with a means for gauging the rate at which they are ingesting fluids. When a preset time has elapsed, an alarm, either visual, e.g. in the form of blinking colored lights or similar visual indicators, or audible, e.g. a chime, buzzer or the like, alerts the consumer that the time has arrived to ingest additional fluid.

Alternative embodiments include a base which includes all monitoring and display functionality as taught above, wherein the base is adapted to receive a drinking glass or the like. A further embodiment is designed in the form of a coaster including interval and alarm monitoring functionality and adapted for resting a drinking glass or the like thereon.

Accordingly, it is an objective of the instant invention to inform a user of the period of time which has elapsed since they last ingested fluids.

It is an additional objective of the instant invention to provide a means for tracking the amount of fluid that is contained in each serving.

Still another objective of the instant invention is to provide the consumer with a means for recording the total number of times the vessel's volume has been ingested within a given period, e.g. one day.

Yet another objective of the instant invention is to provide a means for recording the total volume of fluid ingested within a given period.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Figure 1:
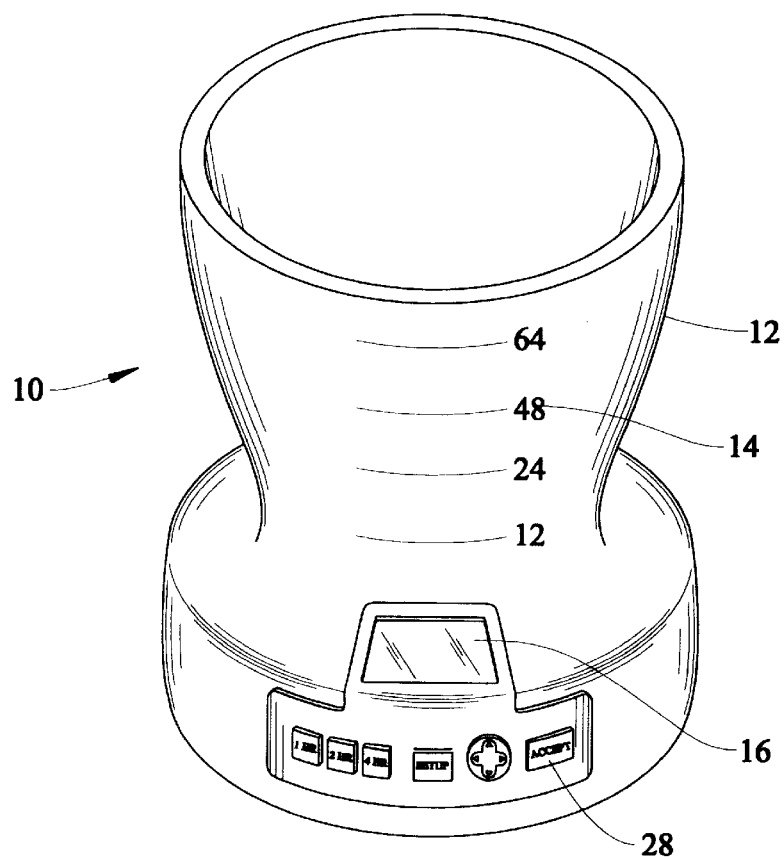
FIG. 1 is a perspective view illustrating a particular embodiment of the invention.

With reference to FIG. 1, a perspective view of the drink dispensing device 10 is shown. Fluids are retained within the reservoir portion 12 of the device. Initially, the user fills the reservoir to a desired volume by referencing the particular volumetric indicia or gradations 14 which are visible on or through the reservoir, dependent upon the opacity of the material of construction. Upon filling, the user initializes the desired mode of operation in the LCD display 16. A plurality of switches 28 facilitate setting various modes of operation. The user then consumes the volume of the reservoir, either at their leisure or at a rate as prompted by the instant device 10. Upon consuming the volume in its totality, the consumer may then access a particular mode for recording the amount consumed and initiating a new time period for consumption of an additional reservoir of fluid. This sequence may be repeated throughout the day until a desired amount has been consumed according to a programmed rate of consumption.

Figure 2:
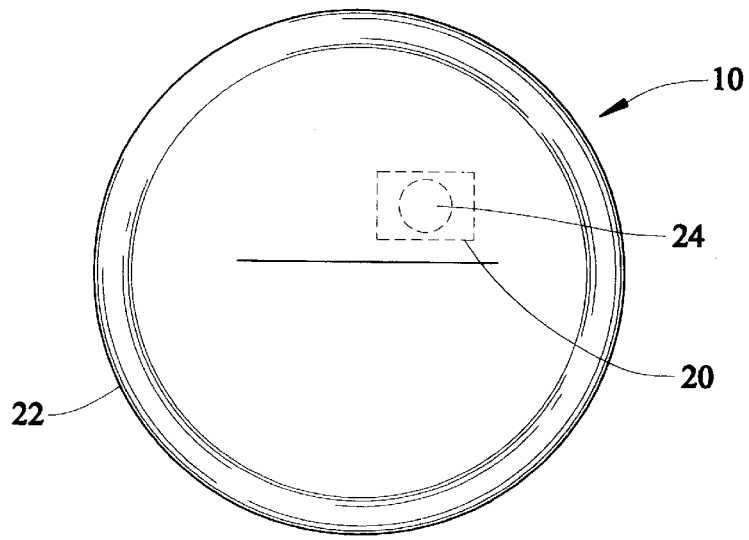
FIG. 2 is a bottom view illustrating inclusion of the programmable timing device within the drinking vessel.

Referring now to FIG. 2, the underside of the device 10 is shown. The timing module 20 is sized for insertion in the base 22 of the vessel as shown. Such placement is illustrative, and it is within the purview of the instant invention to incorporate the timing module 20 in alternative areas of the device 10, for example within an extended handle, within a cavity molded into a sidewall of the vessel, or the like. The timing module 20 contains a replaceable power source, e.g. a battery 24, which may be accessed opening of a suitable access port (not shown). In the illustrated embodiment, the entirety of the timing module 20 is encased within the vessel so as to be resistant to the incursion of water or other fluids during normal cleansing of the vessel. Upon a particularly designated increment of time passing, an alarm (not shown) is activated. This alarm may be either a visual or audible signal, as is known in the art, and upon its activation the user is prompted to consume an additional volume of beverage. The alarm is deactivated by operation of one of the switches 28 (see FIG. 1) adjacent the LCD display for adjusting the mode of operation and also for activating and deactivating the device.

Figure 3:
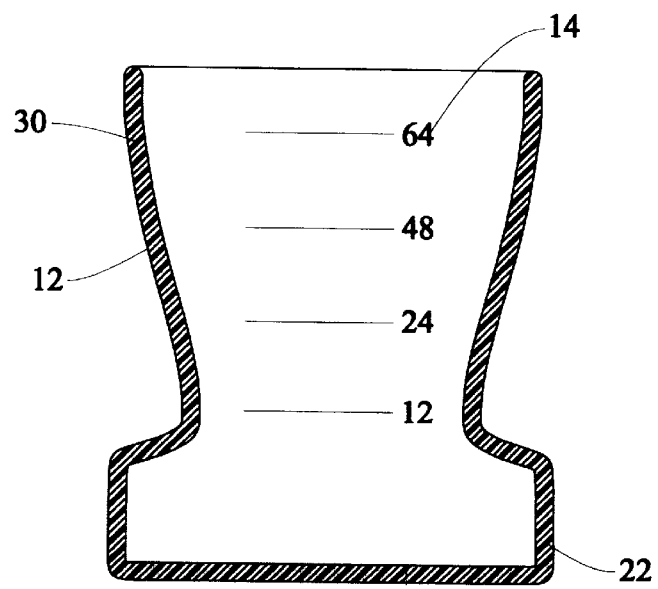
FIG. 3 is a cross-sectional view of the drinking vessel.

Referring to FIG. 3, the drinking device 10 of FIG. 1 is shown in cross-section. The reservoir walls 30 include graduated indicia 14 which may be printed, etched, molded, engraved or the like so as to be visible either through or within the vessel. It is contemplated that the reservoir might be constructed from any suitable material, for example glass, a polymer resin, a metallic material, e.g. stainless steel, or a porcelain or china medium. The base 22, or in the alternative a decorative handle or cavity (not shown), may be formed of the same or different material and may be attachable to or formed as an integral and unitary structure with the reservoir 12.

Figure 4A:
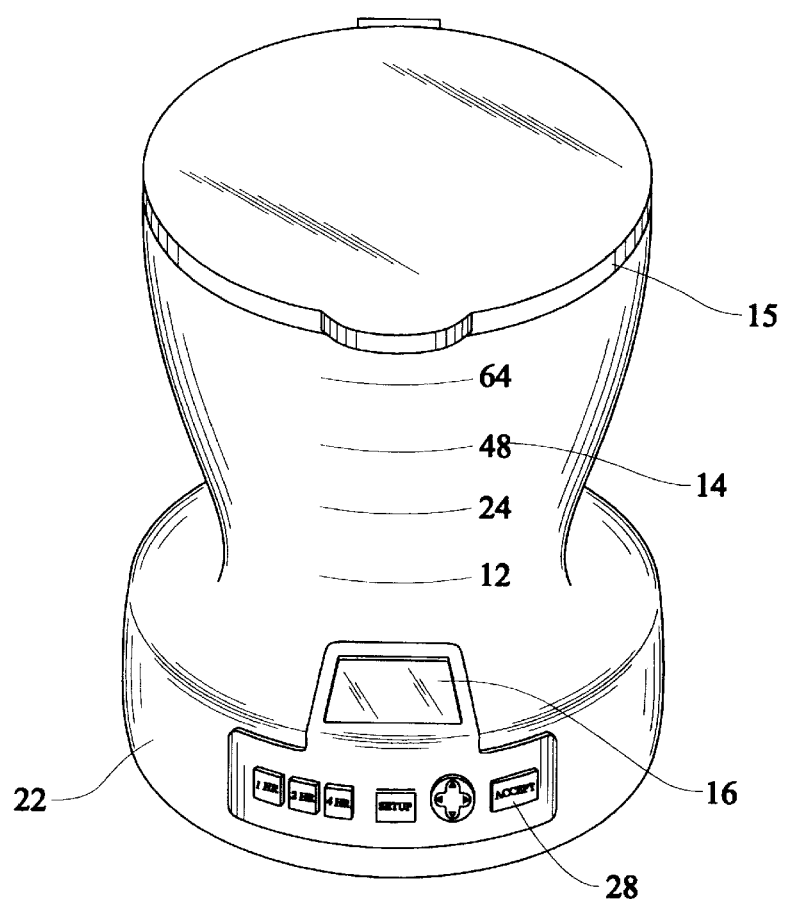
FIG. 4a illustrates an embodiment of the invention wherein the drinking vessel and base are integral.
Figure 5A:
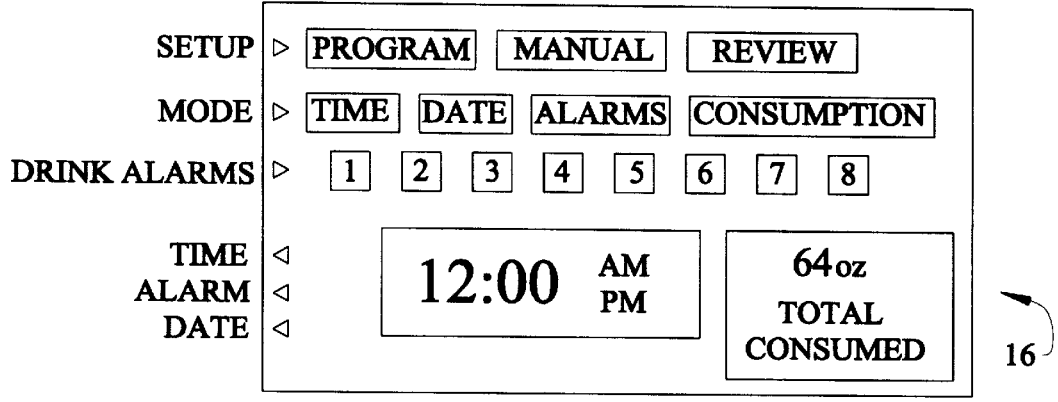
FIG. 5a illustrates an embodiment including a programmable module and the display and control panel therefore.
Figure 5A:
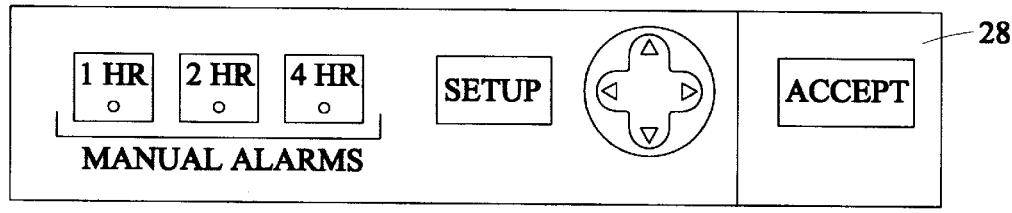

Now referring to FIGS. 4a and 5a, an embodiment of the invention is illustrated wherein the drinking vessel 12 having an optional lid 15 and base 22 are integrally combined. As best seen in FIG. 5a, the LCD display 16 may be toggled for displaying the time of day, alarm set time and date. A setup mode allows the user to input such parameters as date and time, along with the type of alarm, e.g. visual or audible, the interval between alarms, and the particular number of alarms, e.g. alarms 1–8, indicative of an 8 glass consumption regimen.

Figure 4B:
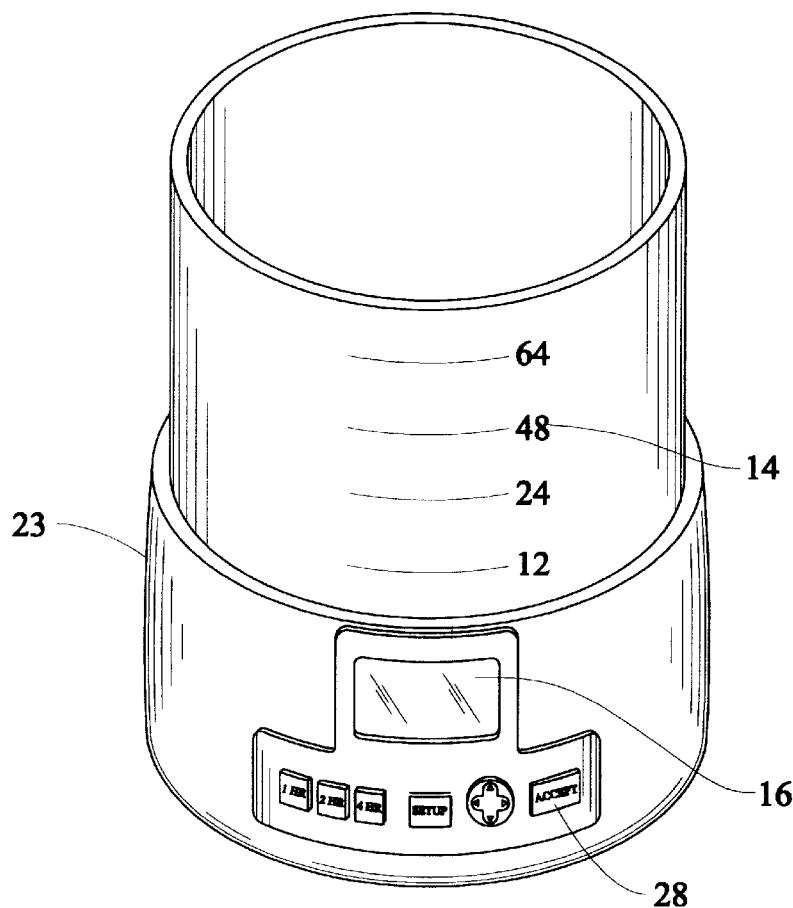
FIG. 4b illustrates an embodiment of the invention wherein the base is adapted for receipt of a drinking vessel.
Figure 5B:
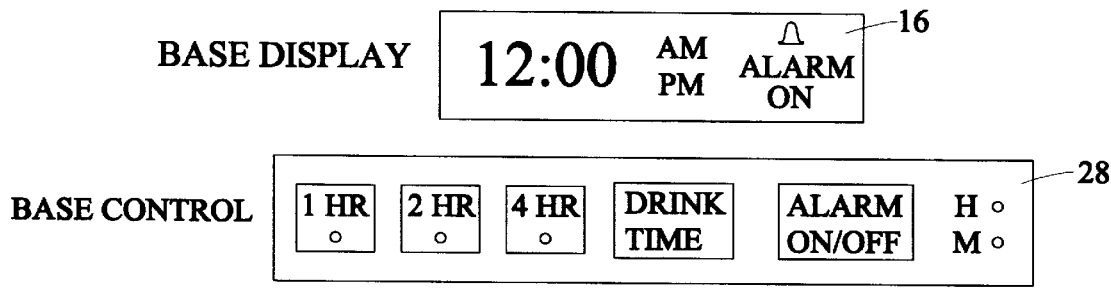
FIG. 5b illustrates the timer controls for the embodiment of FIG. 4c.

Referring to FIG. 4b, an alternative embodiment provides a similarly configured base to that of FIG. 4a, however the drinking reservoir is separate and distinct from the base and the base is constructed and arranged to receive the drinking reservoir therein, for example within an insulated foam sleeve 23. The display and control configuration may be identical to that of FIG. 5a, or alternatively may be as illustrated in FIG. 5b, wherein there are a lesser number of controls, enabling the user to set a drink regimen within particularly timed intervals and to further activate the alarm function according to intervals and/or time of day.

Figure 4C:
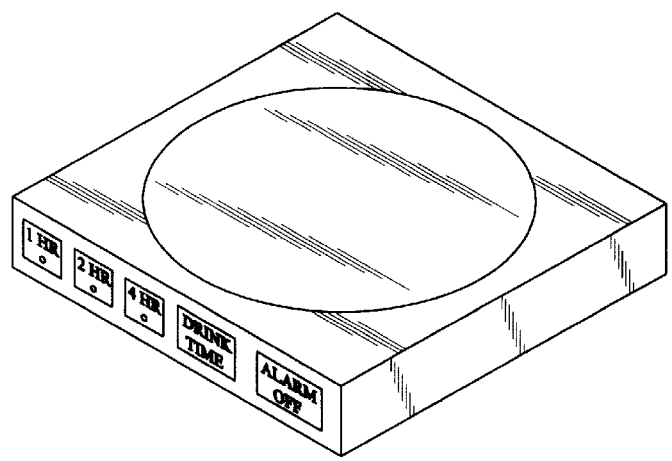
FIG. 4c illustrates an alternative embodiment of the invention wherein the drinking vessel is adapted to rest upon a coaster-style base.
Figure 5C:
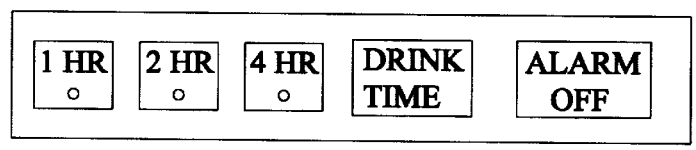
FIG. 5c illustrates the coast style timer controls for the embodiment of FIG. 4c.

Referring to FIG. 4c, a simplified embodiment of the invention is illustrated wherein the alarm function is retained along with an ability to set the time interval, e.g. 1,2 or 4 hours. This configuration is intended for use in the coaster style embodiment illustrated in FIG. 5c, wherein the base is in the form of a drink coaster, having the timer module and controls integral therewith.

What is claimed is:

1. A device for assisting an individual in maintaining a particular rate of fluid consumption consisting of:
   means for holding a fluid;
   means for determining passage of a designated time increment; and
   means for alerting a user of the passage of said designated time increment;

wherein a user activates said means for determining passage of a designated time increment for consumption of a particular volume of fluid, and said user is prompted to consume additional fluid subsequent to passage of said designated time increment.

2. A device in accordance with claim 1, wherein:

said means for holding a fluid is a drinking glass.

3. A device in accordance with claim 1, wherein said means for holding a fluid is graduated.

4. A device in accordance with claim 1, wherein:

said means for determining passage of a designated time increment is constructed and arranged for tracking one or more particular increments.

5. A device in accordance with claim 1, wherein:

said means for alerting a user of passage of a designated time increment is an audible alarm.

6. A device in accordance with claim 1, wherein:

said means for alerting a user of passage of a designated time increment is a visible alarm.

7. A device in accordance with claim 1, wherein:

said means for determining passage of a designated time increment is an electronically controlled timing device.

8. A device in accordance with claim 7, wherein:

said electronically controlled timing device is coupled to a liquid crystal display.

9. A device in accordance with claim 7, wherein:

said electronically controlled timing device is programmable to provide multiple modes of consumption.

10. A device in accordance with claim 1, wherein:

said means for holding a fluid, said means for determining passage of a designated time increment and said means for alerting a user of the passage of said designated time increment are combined to form an integral unit.

11. A device for assisting an individual in maintaining a particular rate of fluid consumption consisting of:

means for determining passage of a designated time increment; and means for alerting a user of the passage of said designated time increment;

wherein a user activates said means for determining passage of a designated time increment for consumption of a particular volume of fluid, and said user is prompted to consume additional fluid subsequent to passage of said designated time increment.

* * * * *